United States Patent
Terada (10) Patent No.: US 8,117,913 B2
(45) Date of Patent: Feb. 21, 2012

(54) ANGULAR VELOCITY SENSOR

(75) Inventor: Jirou Terada, Osaka (JP)

(73) Assignee: Panasonic Corporation, Osaka (JP)

( * ) Notice: Subject to any disclaimer, the term of this patent is extended or adjusted under 35 U.S.C. 154(b) by 429 days.

(21) Appl. No.: 12/377,327

(22) PCT Filed: Aug. 7, 2007

(86) PCT No.: PCT/JP2007/065395
§ 371 (c)(1),
(2), (4) Date: Feb. 12, 2009

(87) PCT Pub. No.: WO2008/023566
PCT Pub. Date: Feb. 28, 2008

(65) Prior Publication Data
US 2010/0218604 A1    Sep. 2, 2010

(30) Foreign Application Priority Data

Aug. 21, 2006 (JP) .................................. 2006-223803
Aug. 21, 2006 (JP) .................................. 2006-223804

(51) Int. Cl.
G01P 9/04 (2006.01)
G01C 19/56 (2006.01)

(52) U.S. Cl. ................... 73/504.12; 73/504.15
(58) Field of Classification Search ............... 73/504.12, 73/504.15, 504.16, 504.04, 504.02, 504.14
See application file for complete search history.

(56) References Cited

U.S. PATENT DOCUMENTS

| | | | |
|---|---|---|---|
| 5,847,487 A * | 12/1998 | Maeno | 310/321 |
| 5,889,208 A * | 3/1999 | Nose | 73/504.16 |
| 6,418,789 B1 * | 7/2002 | Ishitoko et al. | 73/504.12 |
| 6,845,665 B2 * | 1/2005 | Geen | 73/504.04 |
| 6,880,400 B1 * | 4/2005 | Fogliatti et al. | 73/504.12 |
| 7,387,025 B2 * | 6/2008 | Nozoe | 73/504.16 |
| 7,513,140 B2 * | 4/2009 | Kato | 73/1.37 |
| 7,640,803 B1 * | 1/2010 | Gutierrez et al. | 73/504.04 |
| 7,814,792 B2 * | 10/2010 | Tateyama et al. | 73/504.12 |
| 7,886,598 B2 * | 2/2011 | Wyse et al. | 73/504.14 |
| 2003/0101814 A1 * | 6/2003 | Challoner et al. | 73/504.12 |
| 2005/0217375 A1 * | 10/2005 | Mase | 73/504.12 |
| 2006/0016261 A1 | 1/2006 | Tanaka et al. | |

FOREIGN PATENT DOCUMENTS

| | | |
|---|---|---|
| JP | 09-178492 | 7/1997 |
| JP | 2001-082963 | 3/2001 |
| JP | 2001-208546 | 8/2001 |
| JP | 2002-139322 | 5/2002 |
| JP | 2003-185441 | 7/2003 |
| JP | 2005-233706 | 9/2005 |

(Continued)

*Primary Examiner* — Helen C. Kwok
(74) *Attorney, Agent, or Firm* — Pearne & Gordon LLP (57) ABSTRACT

Disclosed is an angular velocity sensor for achieving downsizing of a variety of electronic devices. For this purpose, the angular velocity sensor has a subtracter for outputting a first differential signal based on two sensor signals output from a first sensing electrode unit and a second sensing electrode unit, an adder for outputting a first additional signal, another subtracter for outputting a second differential signal based on two sensor signals output from a third sensing electrode unit and a fourth sensing electrode unit, and another adder for outputting a second additional signal. The sensor then detects an angular velocity from an additional signal obtained based on the first differential signal and the second differential signal and a differential signal obtained based on the first additional signal and the second additional signal.

5 Claims, 10 Drawing Sheets

FOREIGN PATENT DOCUMENTS

| | | |
|---|---|---|
| JP | 2005-233706 A | 9/2005 |
| JP | 2006-030125 | 2/2006 |
| JP | 2006-30125 A | 2/2006 |
| JP | 2006-105756 | 4/2006 |
| JP | 2006-105756 A | 4/2006 |
| WO | 2005-078389 A1 | 8/2005 |

* cited by examiner

ANGULAR VELOCITY SENSOR

TECHNICAL FIELD

The present invention relates to an angular velocity sensor for detecting angular velocity used in a variety of electronic devices for the purpose of controlling attitude, navigation and the like functions of movable bodies such as aircrafts, automobiles, robots, ships, vehicles and the like.

BACKGROUND ART

Description is provided hereinafter of a conventional angular velocity sensor.

The conventional angular velocity sensor detects an angular velocity by vibrating a sensing element of such a shape as a tuning fork, a letter H and a letter T, for example, and electrically detecting a distortion of the sensing element caused by a Coriolis force.

When a vehicle is disposed on an X-Y plane between X axis and Y axis within a space of the mutually orthogonal axes of X, Y and Z, for instance, the angular velocity sensor for navigation device is required to detect angular velocities around the X axis and the Z axis of the vehicle.

For detecting angular velocities of a plurality of axes (e.g., X axis, Y axis and Z axis) it has been the general practice in the past to use a plurality of angular velocity sensors, each corresponding to the respective axis of detection. In addition, a sensing element has been positioned vertically on the X-Y plane when detecting an angular rate around the Z axis.

Patent reference 1, for instance, is one of the prior art documents known to be related to the invention of the present application.

In the case of the above structure, however, it is necessary to provide a mounting area sufficient for installing a plurality of sensing elements or a plurality of angular velocity sensors on a mount board when detecting angular velocities of a plurality of axes, so that it is difficult to make downsizing of the variety of electronic devices.

Patent Reference 1: Unexamined Japanese Patent Publication, No. 2001-208546

SUMMARY OF THE INVENTION

The present invention is contrived to solve the above disadvantages, and to provide angular velocity sensors that enable downsizing of a variety of electronic devices since the invention makes it unnecessary to provide a large mounting area otherwise required for installation of a plurality of sensing elements or a plurality of angular velocity sensors even for detecting angular velocities of a plurality of axes.

To achieve the object, the present invention provides a structure specifically comprising a driver circuit unit for supplying two driving signals to a driver unit, and a detector circuit unit for outputting a first differential signal according to two sensor signals output from a first sensor unit, a second differential signal according to two sensor signals output from a second sensor unit, a first additional signal according to the two sensor signals output from the first sensor unit, and a second additional signal according to the two sensor signals output from the second sensor unit, and detecting an angular velocity from an additional signal based on the first differential signal and the second differential signal and a differential signal based on the first additional signal and the second additional signal.

The above structure enables a single unit of sensing element to detect angular velocities around two detecting axes since a value of the additional signal based on the first differential signal and the second differential signal and a value of the differential signal based on the first additional signal and the second additional signal are different with respect to each other when detecting the angular velocities around both the Z axis and the X axis among the three mutually orthogonal axes of X, Y and Z.

Accordingly, this invention makes it unnecessary to provide a mounting area for installing a plurality of sensing elements or a plurality of angular velocity sensors, but only a space appropriate for mounting a single sensing element, when detecting angular velocities of the plurality of axes, thereby achieving downsizing of the variety of electronic devices.

REFERENCE MARKS IN THE DRAWINGS

1 Sensing element
2 First arm
4 Second arm
6 Supporting portion
8 Fixing arm
9 Fixing portion
10 Third arm
11 Weight
12, 13, 14 and 15 Amplifier
16 Confronting portion
17 Driver unit
17a First driving electrode unit
17b Second driving electrode unit
18 Detector unit
18a First detecting electrode unit
18b Second detecting electrode unit
19 First sensor unit
19a First sensing electrode unit
19b Second sensing electrode unit
20 Second sensor unit
20a Third sensing electrode unit 20b Fourth sensing electrode unit
21 Driver circuit unit
25 Detector circuit unit
30, 34 and 40 Subtracter
32, 36 and 38 Adder
42 and 44 Wave-detector circuit
46 and 48 Low-pass filter
50 Failure diagnosis signal generator

DETAILED DESCRIPTION OF PREFERRED EMBODIMENT

Figure 1:
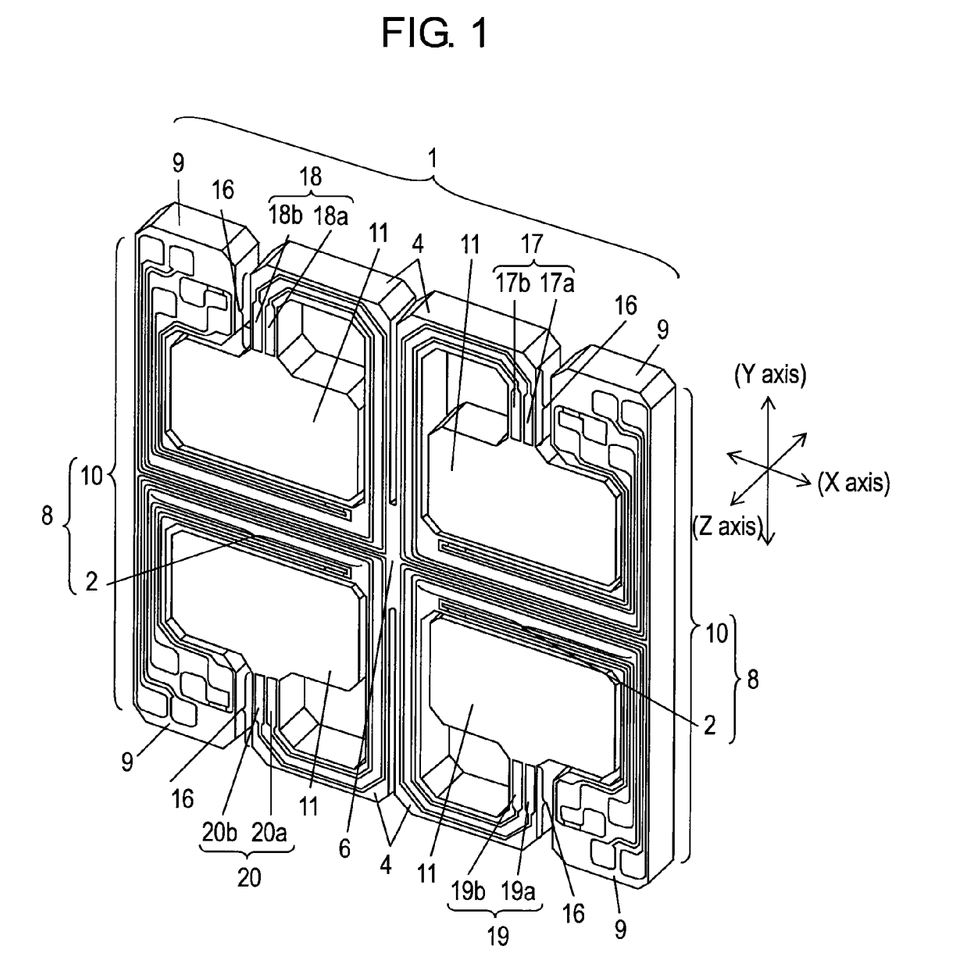
FIG. 1 is a perspective view illustrating a sensing element of an angular velocity sensor according to one exemplary embodiment of the present invention.

FIG. 1 is a perspective view illustrating a sensing element of an angular velocity sensor according to one exemplary embodiment of the present invention.

In FIG. 1, the angular velocity sensor in this exemplary embodiment of the invention includes sensing element 1 for detecting an angular velocity. This sensing element 1 has two orthogonally-configured arms, each consisting of first arm 2 coupled to second arm 4 in a direction substantially orthogonal to each other. Sensing element 1 also has supporting portion 6, which supports two first arms 2, and fixing arms 8 having one ends connected to supporting portion 6 and the other ends for fixation to a mount board (not shown).

Fixing arms 8 have an orthogonally-configured arm structure consisting of third arms 10, each coupled to respective one of first arms 2 in a direction substantially orthogonal to each other, and fixing portions 9 formed at both ends of third arms 10 are used for fixation to the mount board. Second arms 4 are bent back to form confronting portions 16 in a manner that they face respective portions of their own second arms 4, and weights 11 are connected to respective ends of confronting portions 16.

In this sensing element 1, first arms 2 of fixing arms 8 and supporting portion 6 are formed substantially linearly so that second arms 4 are oriented along the direction of Y axis when sensing element 1 is disposed with first arms 2 in an orientation of X axis within a space of the three mutually orthogonal axes of X, Y and Z.

In addition, sensing element 1 is provided with driver unit 17 for driving weights 11 into vibratory motion and detector unit 18 for detecting a driving condition on confronting portions 16 of two adjacent second arms 4 at one side (i.e., the upper side in FIG. 1) amongst four second arms 4. Sensing element 1 is also provided with first sensor unit 19 and second sensor unit 20 for sensing distortion of second arms 4 on confronting portions 16 of two adjacent second arms 4 at the other side (i.e., the lower side in FIG. 1).

This driver unit 17 are electrode units intended for driving weights 11 of second arms 4, and detector unit 18 are electrode units intended for detecting the driving condition of second arms 4. First driving electrode unit 17a and second driving electrode unit 17b are formed on one of second arms 4 in a confronting manner to compose driver unit 17, and first detecting electrode unit 18a and second detecting electrode unit 18b are formed on the other second arm 4 also in a confronting manner to compose detector unit 18. Each of these first and second driving electrode units 17a, 17b and first and second detecting electrode units 18a and 18b consists of a top electrode and a bottom electrode with a piezoelectric element interposed between them.

First sensor unit 19 and second sensor unit 20 include electrode units for sensing distortion of two second arms 4. First sensing electrode unit 19a and second sensing electrode unit 19b are formed on one of second arms 4 in a confronting manner, and third sensing electrode unit 20a and fourth sensing electrode unit 20b are formed on the other second arm 4 also in a confronting manner to compose first sensor unit 19 and second sensor unit 20 respectively. Each of these first through fourth sensing electrode units 19a, 19b, 20a and 20b also consists of a top electrode and a bottom electrode with a piezoelectric element interposed between them.

The above-mentioned first and second driving electrode units 17a, 17b, first and second detecting electrode units 18a, 18b, and first through fourth sensing electrode units 19a, 19b, 20a and 20b can be composed by forming the bottom electrodes of platinum (Pt) on a silicon substrate with high frequency sputtering, the piezoelectric elements of lead zirconate titanate (PZT) on top of the bottom electrodes with high frequency sputtering, and the top electrodes of gold (Au) on top of the PZT piezoelectric elements with vapor deposition.

When an AC voltage of a resonance frequency is applied to first and second driving electrode units 17a and 17b, second arm 4 is driven and vibrated with the origin located at confronting portion 16 where driver unit 17 is formed. This causes all of four second arms 4 and four weights 11 to vibrate in harmony with one another. When second arms 4 are distorted due to an angular velocity motion, first through fourth sensing electrode units 19a, 19b, 20a and 20b output voltages responsive to the distortion, thereby enabling the sensor to detect an angular velocity according to these output voltages.

Figure 2:
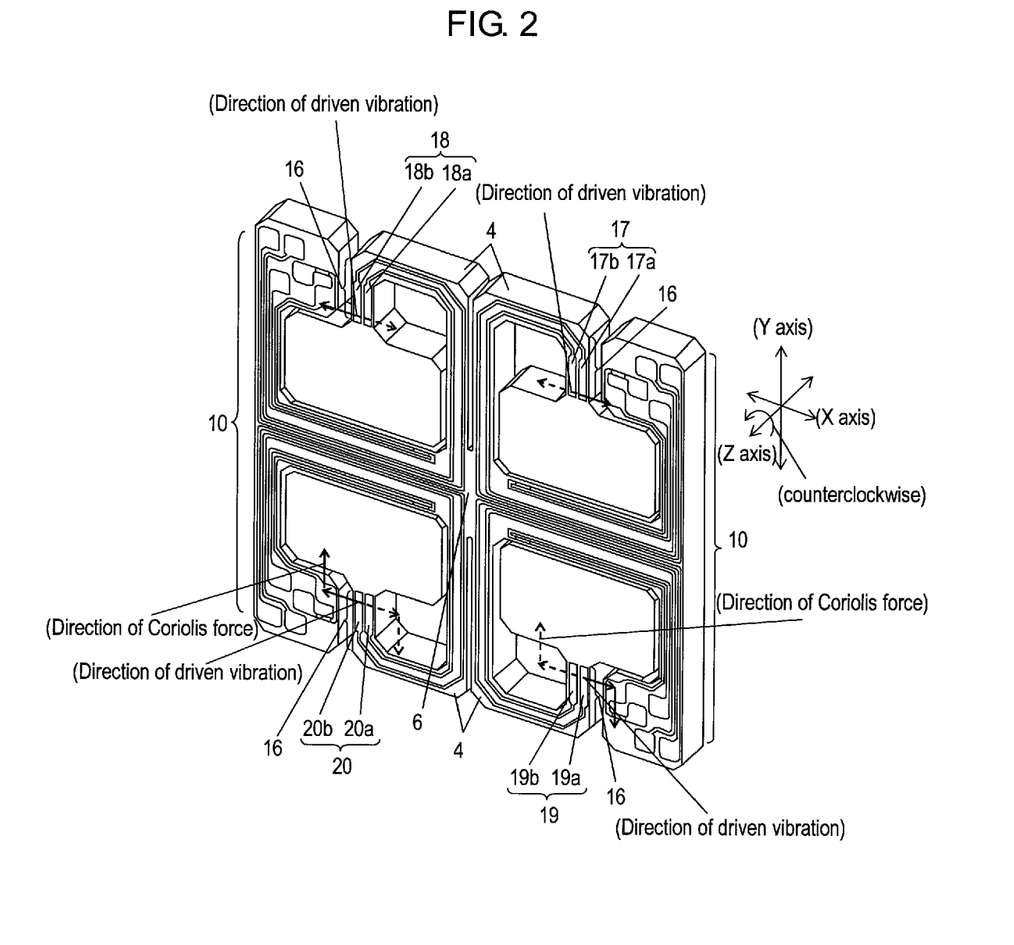
FIG. 2 is another view illustrating an operating state of the sensing element of the angular velocity sensor.

FIG. 2 illustrates an operating state of sensing element 1.

When sensing element 1 is placed in a position that first arms 2 and second arms 4 are oriented along X axis and Y axis respectively within a space of the mutually orthogonal or substantially orthogonal axes of X, Y and Z, and an AC voltage of the resonance frequency is applied to first and second driving electrode units 17a and 17b, second arm 4 is driven and vibrated with the origin located at confronting portion 16 where driver unit 17 is formed. This causes weight 11 to vibrate in the direction that it faces second arm 4 (i.e., the direction of X axis where second arm 4 faces its own confronting portion 16, which is shown by a bidirectional arrow of solid and dotted lines). At the same time, this causes all of four second arms 4 and four weights 11 to vibrate in harmony with each other in the same direction of facing respective second arms 4. The driving direction for vibrating this sensing element 1 is thus defined as to be X axis.

When an angular velocity motion occurs in this state in the direction of counterclockwise about the Z axis, for instance, it generates a Coriolis force affecting on weights 11 in the direction orthogonal to the direction of vibration (i.e., directions of Coriolis force shown by a solid-line arrow and a dotted-line arrow), and this Coriolis force can produce distortion in second arms 4 attributed to the angular velocity motion in counterclockwise about the Z axis. This Coriolis force acts in the direction of Y axis of sensing element 1.

When the Coriolis force is generated in the direction shown by the solid-line arrow, first sensing electrode unit 19a and third sensing electrode unit 20a sense contraction, and second sensing electrode unit 19b and fourth sensing electrode unit 20b sense expansion of their respective confronting portions 16 of second arms 4, amongst the first through fourth sensing electrode units 19a, 19b, 20a and 20b formed on confronting portions 16 of second arms 4. On the other hand, first sensing electrode unit 19a, third sensing electrode unit 20a, second sensing electrode unit 19b and fourth sensing electrode unit 20b sense expansion and contraction inversely when the Coriolis force is generated in the direction shown by the dotted-line arrow.

First through fourth sensing electrode units 19a, 19b, 20a and 20b thus output voltages responsive to sensed magnitudes of the expansion and the contraction, so as to detect the angular velocity based on these output voltages.

When an angular velocity motion occurs in the direction of clockwise about the Z axis, on the other hand, confronting portions 16 of second arms 4 expand and contract in a manner diametrically opposite to the case the angular velocity motion occurs counterclockwise about the Z axis. First through fourth sensing electrode units 19a, 19b, 20a and 20b also sense these expansion and contraction, and detect the angular velocity in the same manner.

When an angular velocity motion occurs around the Y axis, it also generates a Coriolis force affecting on weights 11 in the direction orthogonal to the direction of vibration (i.e., the direction of Z axis). The Coriolis force then produces distortion in second arms 4 attributed to the angular velocity motion about the Y axis, and first through fourth sensing electrode units 19a, 19b, 20a and 20b sense the expansion and the contraction of confronting portions 16 of second arms 4 and detect the angular velocity in the like manner.

The distortion generated by the angular velocity motion in any of the Z axis and Y axis also occurs in second arms 4 where first and second driving electrode units 17a, 17b, and first and second detecting electrode units 18a and 18b are formed. It is therefore possible that first through fourth sensing electrode units 19a, 19b, 20a and 20b are formed on second arms 4 where first and second driving electrode units 17a, 17b, and first and second detecting electrode units 18a and 18b are formed.

Figure 3:
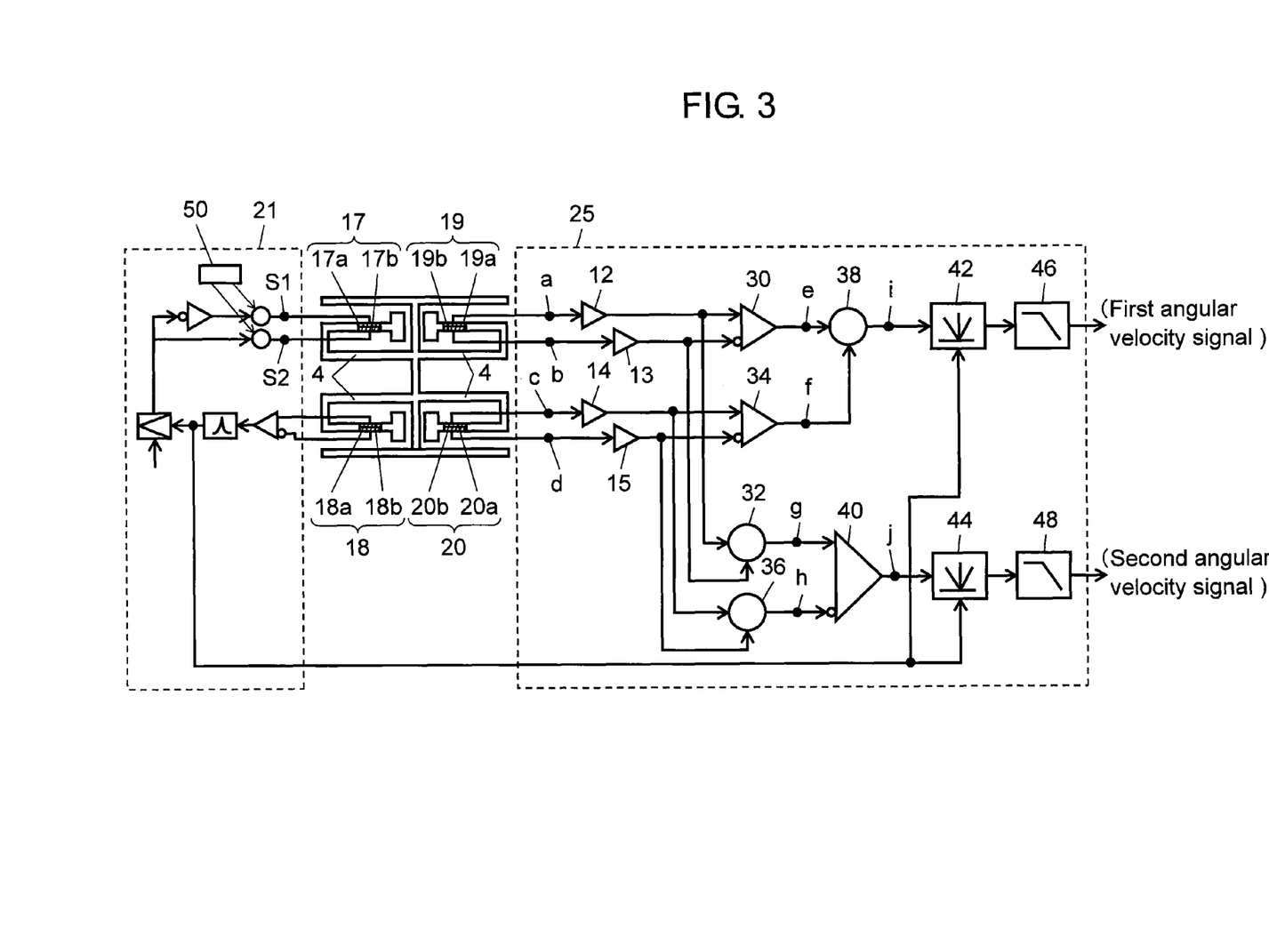
FIG. 3 is a circuit block diagram of the angular velocity sensor.

FIG. 3 is a circuit block diagram of the angular velocity sensor.

In FIG. 3, driver unit 17 and detector unit 18 formed on two mutually confronting second arms 4 (i.e., those at the upper side in FIG. 1) amongst four second arms 4 are connected to driver circuit unit 21. First sensor unit 19 and second sensor unit 20 formed on the other two of second arms 4 (i.e., those at the lower side in FIG. 1) are connected to detector circuit unit 25.

Description is now provided of a process carried out in detector circuit unit 25 for two sensor signals output from first sensor unit 19 and second sensor unit 20.

The two sensor signals output from first sensing electrode unit 19a and second sensing electrode unit 19b constituting first sensor unit 19 are amplified individually by amplifiers 12 and 13. Using these two sensor signals, subtracter 30 outputs a first differential signal (at signal point "e"). At the same time, the two sensor signals amplified by amplifiers 12 and 13 are also distributed to adder 32, which outputs a first additional signal (at signal point "g") using these two distributed sensor signals.

The two sensor signals output from third sensing electrode unit 20a and fourth sensing electrode unit 20b constituting second sensor unit 20 are amplified by amplifiers 14 and 15, and subtracter 34 outputs a second differential signal (at signal point "f") using these two sensor signals. At the same time, the two sensor signals amplified by amplifiers 14 and 15 are distributed to adder 36, which outputs a second additional signal (at signal point "h") using these two distributed sensor signals.

Furthermore, adder 38 outputs an additional signal (at signal point "i") by using the first differential signal output from subtracter 30 and the second differential signal output from subtracter 34. In addition, subtracter 40 outputs a subtraction signal (at signal point "j") by using the first additional signal output from adder 32 and the second additional signal output by adder 36.

The additional signal and the subtraction signal are then detected by wave-detector circuits 42 and 44, and they are output through low-pass filters 46 and 48 as a first angular velocity signal and a second angular velocity signal.

Angular velocities in a plurality of detecting axes can be hence detected by comparing values of these first and second angular velocity signals.

Figure 4:
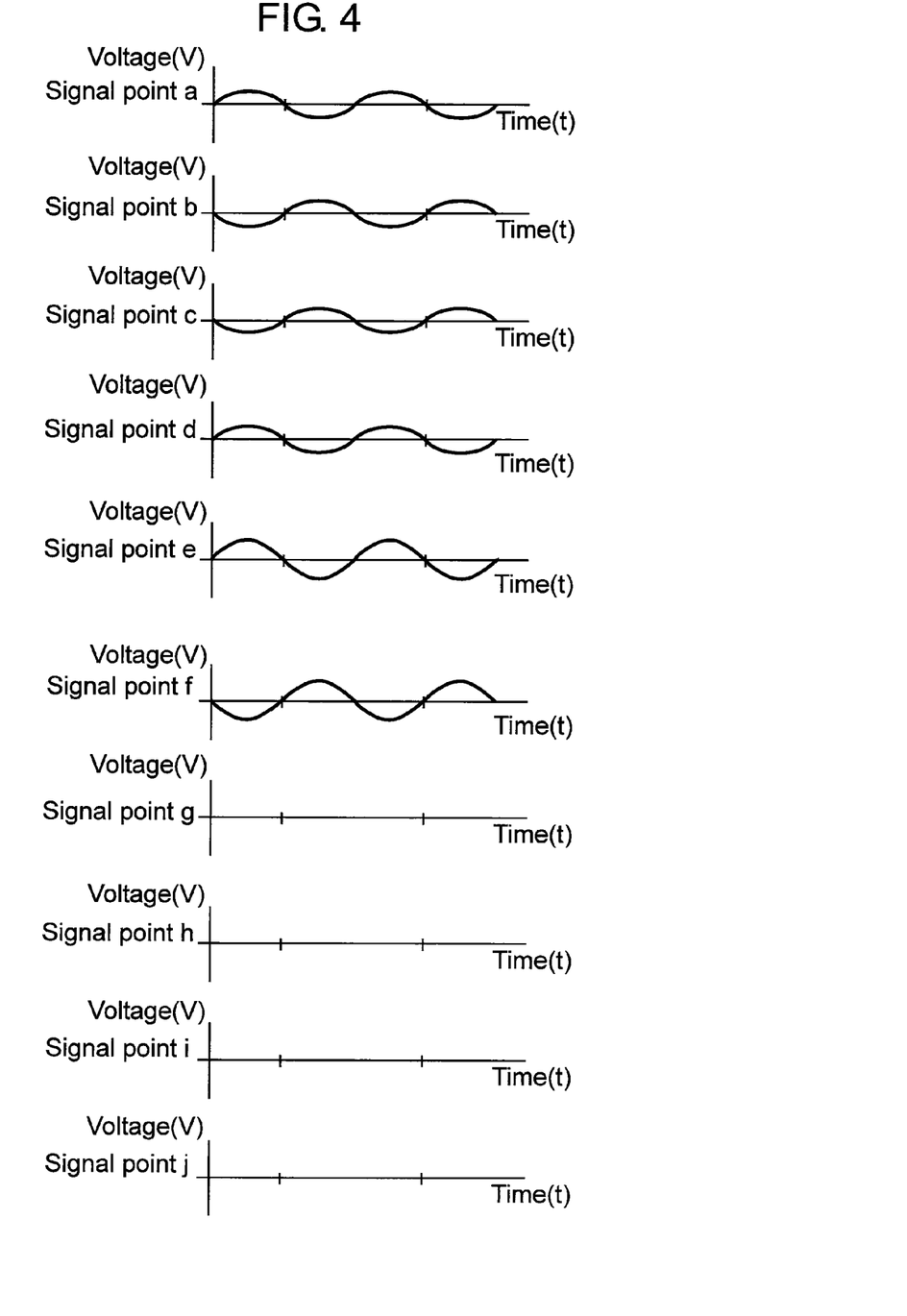
FIG. 4 is an illustration of typical waveforms at individual signal points when there is no angular velocity motion.
Figure 5:
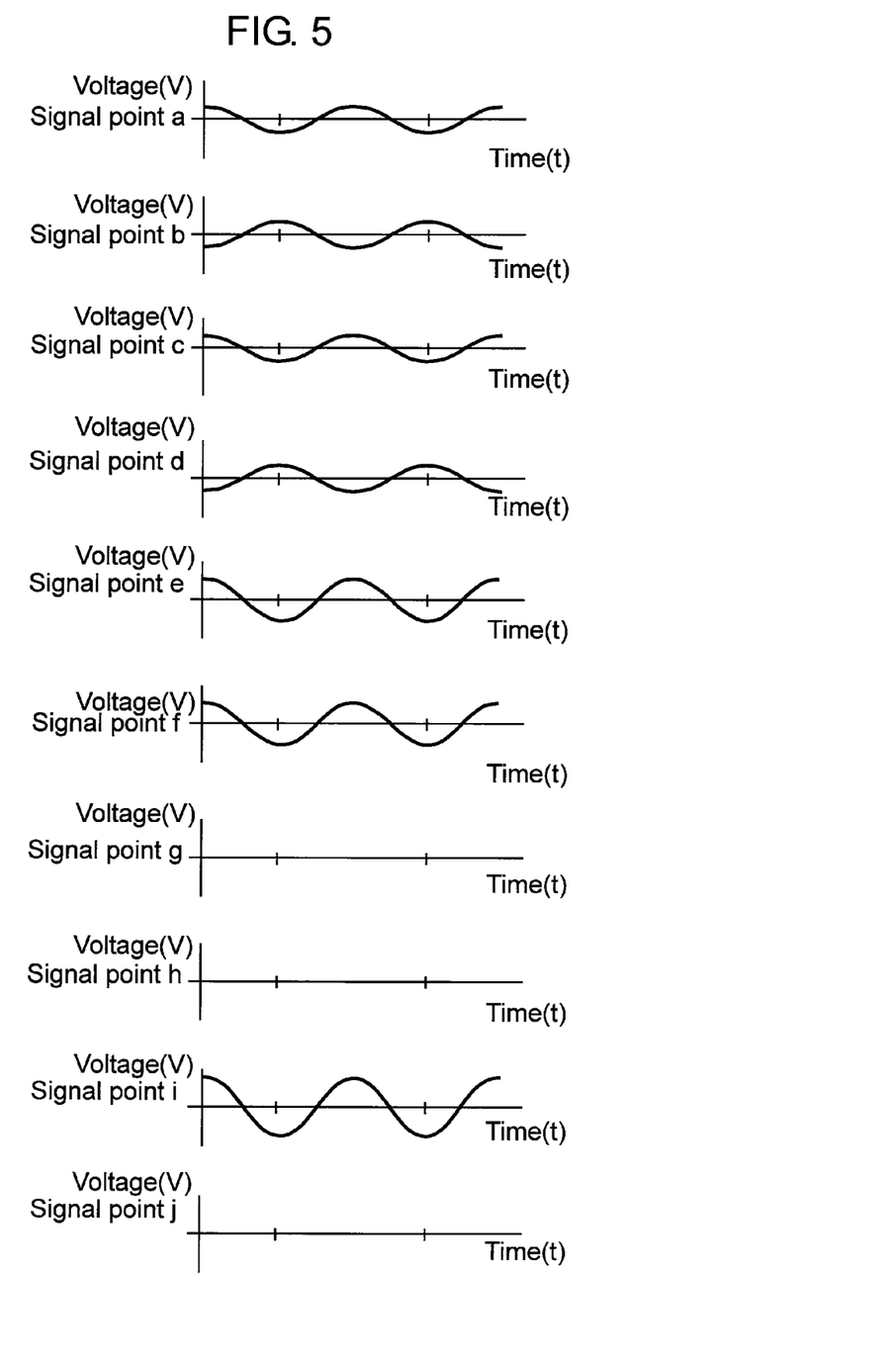
FIG. 5 is an illustration of typical waveforms at the individual signal points when there is an angular velocity motion around the Z axis.
Figure 6:
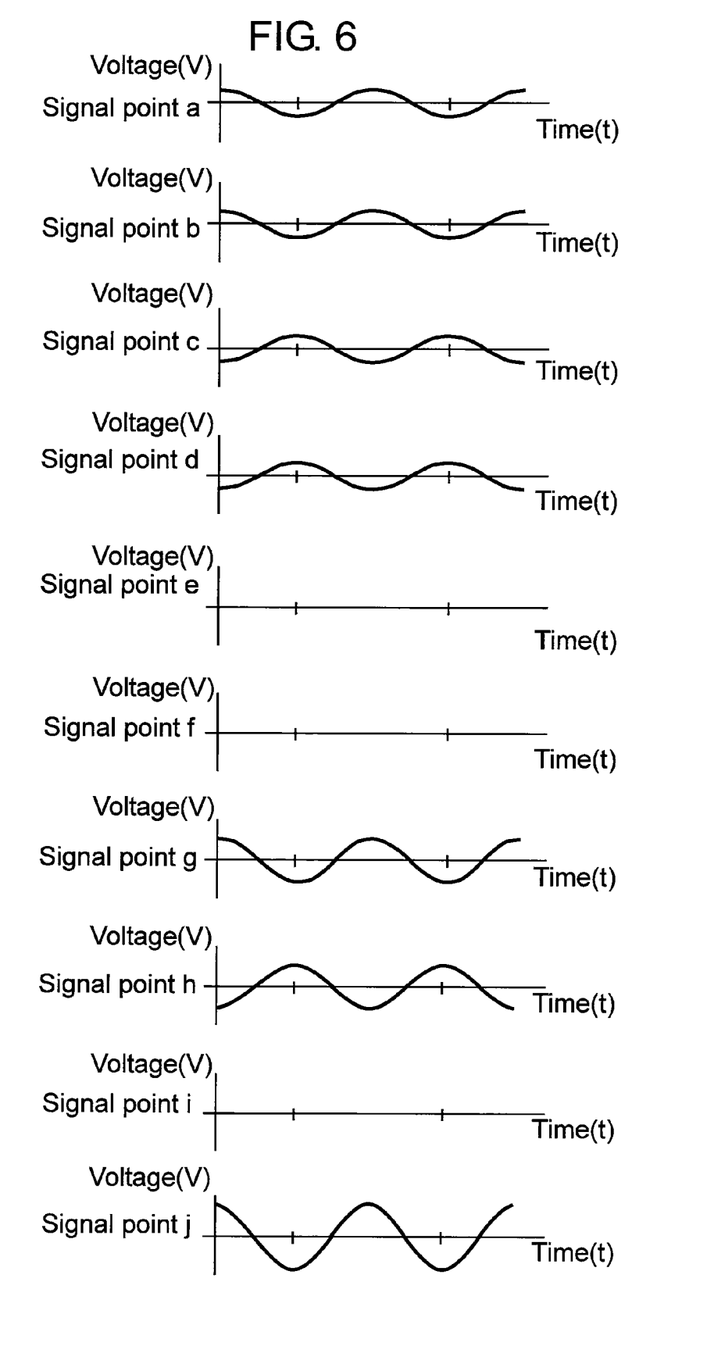
FIG. 6 is an illustration of typical waveforms at the individual signal points when there is an angular velocity motion around the Y axis.

In operating conditions of this sensing element 1 here, typical waveforms found at the individual signal points "a" to "j" of detector circuit unit 25 are as illustrated in FIG. 4 through FIG. 6.

FIG. 4 is an illustration of typical waveforms at the individual signal points when there is no angular velocity motion, FIG. 5 is another illustration of typical waveforms at the individual signal points when there is an angular velocity motion around the Z axis, and FIG. 6 is still another illustration of typical waveforms at the individual signal points when there is an angular velocity motion around the Y axis. FIG. 5 and FIG. 6, in particular, illustrate specific waveforms abstracted to show only the Coriolis components.

When there is no angular velocity motion, signal waves do not appear at both the signal points "i" and "j" as shown in FIG. 4, indicating no output of the first and second angular velocity signals.

When there is an angular velocity motion around the Z axis, a signal wave is output at the signal point "i", but no signal wave at the signal point "j" as shown in FIG. 5, indicating that the second angular velocity signal is not output.

When there is an angular velocity motion around the Y axis, no signal wave appears at the signal point "i", indicating that the first angular velocity signal is not output, but a signal wave is output at the signal point "j" as shown in FIG. 6.

It is thus possible to detect various states of bearing the angular velocity motion distinctively since the specific signal waveforms produced at the signal points "i" and "j" are different among the cases when the angular velocity motion occurs around the Y axis, around the Z axis and when there is no angular velocity motion at all.

The above structure can hence enable a single unit of the sensing element to detect angular velocities around the two axes of detection since a value of the additional signal (i.e., the specific waveform at the signal point "i") based on the first differential signal and the second differential signal and a value of the differential signal (i.e., the specific waveform at the signal point "j") based on the first additional signal and the second additional signal are different with respect to each other when detecting the angular velocities around both the Z axis and the X axis among the three mutually orthogonal axes of X, Y and Z.

More specifically, there is not any output value of differential signal (i.e., the specific waveform at the signal point "j") based on the first additional signal and the second additional signal when an angular velocity motion occurs only around the Z axis, and there is not any output value of additional signal (i.e., the specific waveform at the signal point "i") based on the first differential signal and the second differential signal when an angular velocity motion occurs only around the Y axis. It is therefore determinable that an angular velocity motion takes place around both of the Y axis and the Z axis at the same time if there are outputs of specific waveforms at both the signal points "i" and "j", so as to make angular velocities detectable around the two axes of detection simultaneously.

It is also possible to distinguish the absence of angular velocity motion from the presence thereof since there is neither an output value of the additional signal (i.e., the specific waveform at the signal point "i") nor an output value of differential signal (i.e., the specific waveform at the signal point "j") based on the first differential signal and the second differential signal when there is no angular velocity motion.

In the case when a value of the additional signal (at the signal point "i") based on the first differential signal and the second differential signal is different from a value of the differential signal (at the signal point "j") and if they have a certain ratio of relation, it is then possible to achieve a similar effect by converting this ratio.

Accordingly, the present invention makes it unnecessary to provide a mounting area for a plurality of sensing elements or a plurality of angular velocity sensors, but only a space appropriate for mounting a single sensing element, when detecting angular velocities of the plurality of axes, thereby achieving downsizing of a variety of electronic devices.

Description is provided next of a process carried out in the circuit for diagnosing failures.

In driver circuit unit 21 of FIG. 3, failure diagnosis signal generator 50 supplies two failure diagnosis signals of same phase or opposite phase to first and second driving electrode units 17a and 17b when angular velocity motion is not present. In the next step, detector circuit unit 25 compares a signal output from the additional signal and the differential signal with signals output in the normal state of bearing an angular velocity motion, and determines if they coincide with each other. It can be determined when these signals coincide that detector circuit unit 25 detects a pseudo angular velocity, and therefore no failure exists.

It is preferable in this case that the driving signal and the failure diagnosis signal have waveforms different in phase by 90 degrees.

Figure 7:
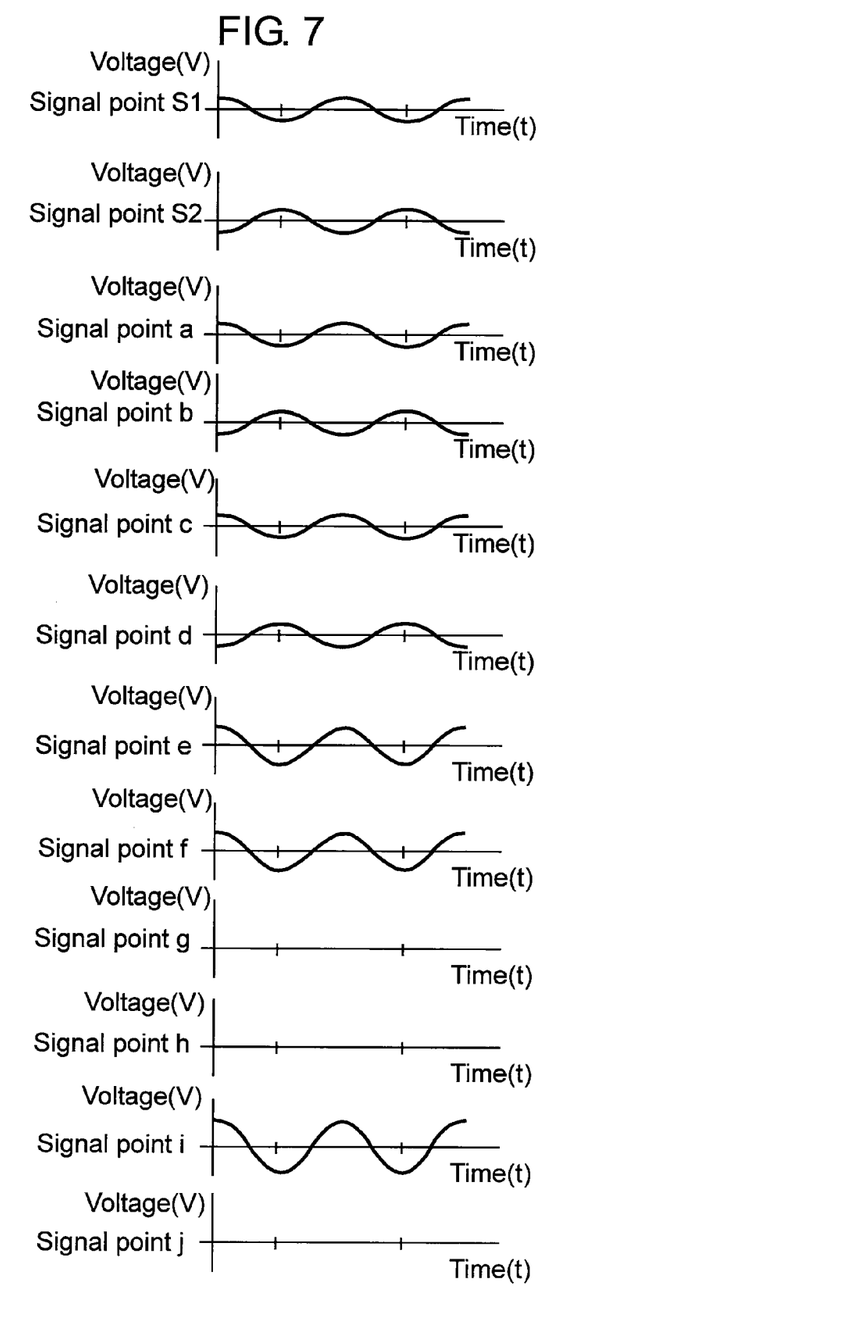
FIG. 7 is an illustration of typical waveforms at the individual signal points in response to two failure diagnosis signals of opposite phase.
Figure 8:
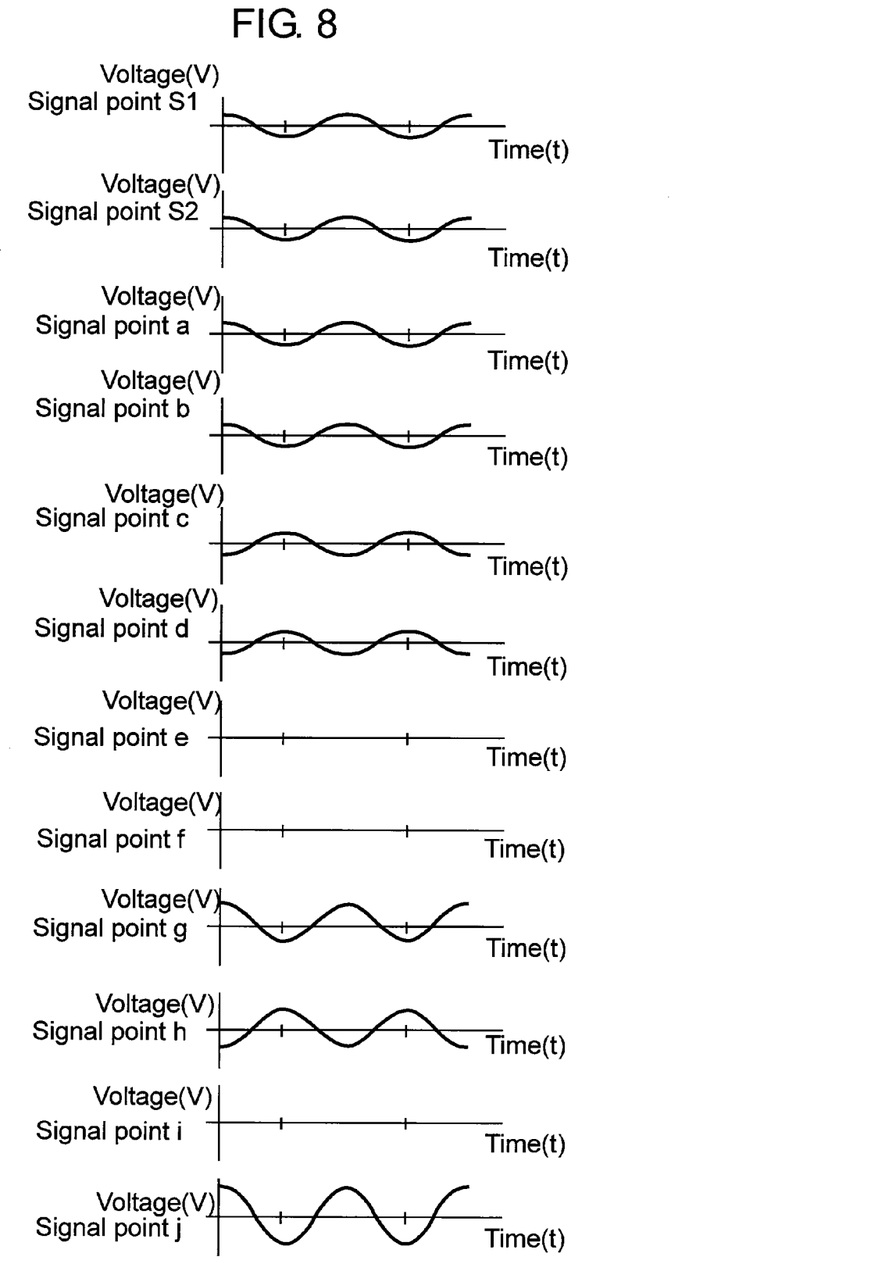
FIG. 8 is an illustration of typical waveforms at the individual signal points in response to two failure diagnosis signals of same phase.

In the failure diagnostic mode here, typical waveforms found at the individual signal points S1 and S2 of driver circuit unit 21 and the signal points "a" to "j" of detector circuit unit 25 are as illustrated in FIG. 7 and FIG. 8.

FIG. 7 is an illustration of the typical waveforms at the individual signal points S1 and S2 corresponding to the two failure diagnosis signals of opposite phase, and FIG. 8 is another illustration of typical waveforms at the individual signal points S1 and S2 corresponding to the two failure diagnosis signals of same phase.

As shown in FIG. 7, a value of the additional signal is output (i.e., the waveform at the signal point "i") based on the first differential signal and the second differential signal, but no value of differential signal is output (i.e., no waveform at the signal point "j") in the like manner as if there is an angular velocity motion only around the Z axis, when the two failure diagnosis signals are in the opposite phase.

When the two failure diagnosis signals are in the same phase, on the other hand, a value of the additional signal is not output (i.e., no waveform at the signal point "i") based on the first differential signal and the second differential signal, but only a value of the differential signal is output (i.e., the waveform at the signal point "j") in the like manner as if there is an angular velocity motion only around the Y axis, as shown in FIG. 8.

The invented structure is therefore capable of determining the presence or absence of any failure in the sensing element and the detector circuit unit by virtue of supplying the two failure diagnosis signals of the same phase or the opposite phase to first and second driving electrode units 17a and 17b in the driver unit, and detecting a pseudo angular velocity from the additional signal and the differential signal.

In this exemplary embodiment of the invention, first and second driving electrode units 17a, 17b, first and second detecting electrode units 18a, 18b, first through fourth sensing electrode units 19a, 19b, 20a and 20b are illustrated as being formed on confronting portions 16 of second arms 4. However, they may be formed on other positions than confronting portions 16 of second arms 4. For instance, all of first and second driving electrode units 17a, 17b, first and second detecting electrode units 18a, 18b, first through fourth sensing electrode units 19a, 19b, 20a and 20b can be formed on positions of four second arms 4 in the vicinity of supporting portion 6, or positions in parallel with first arms 2.

Figure 9:
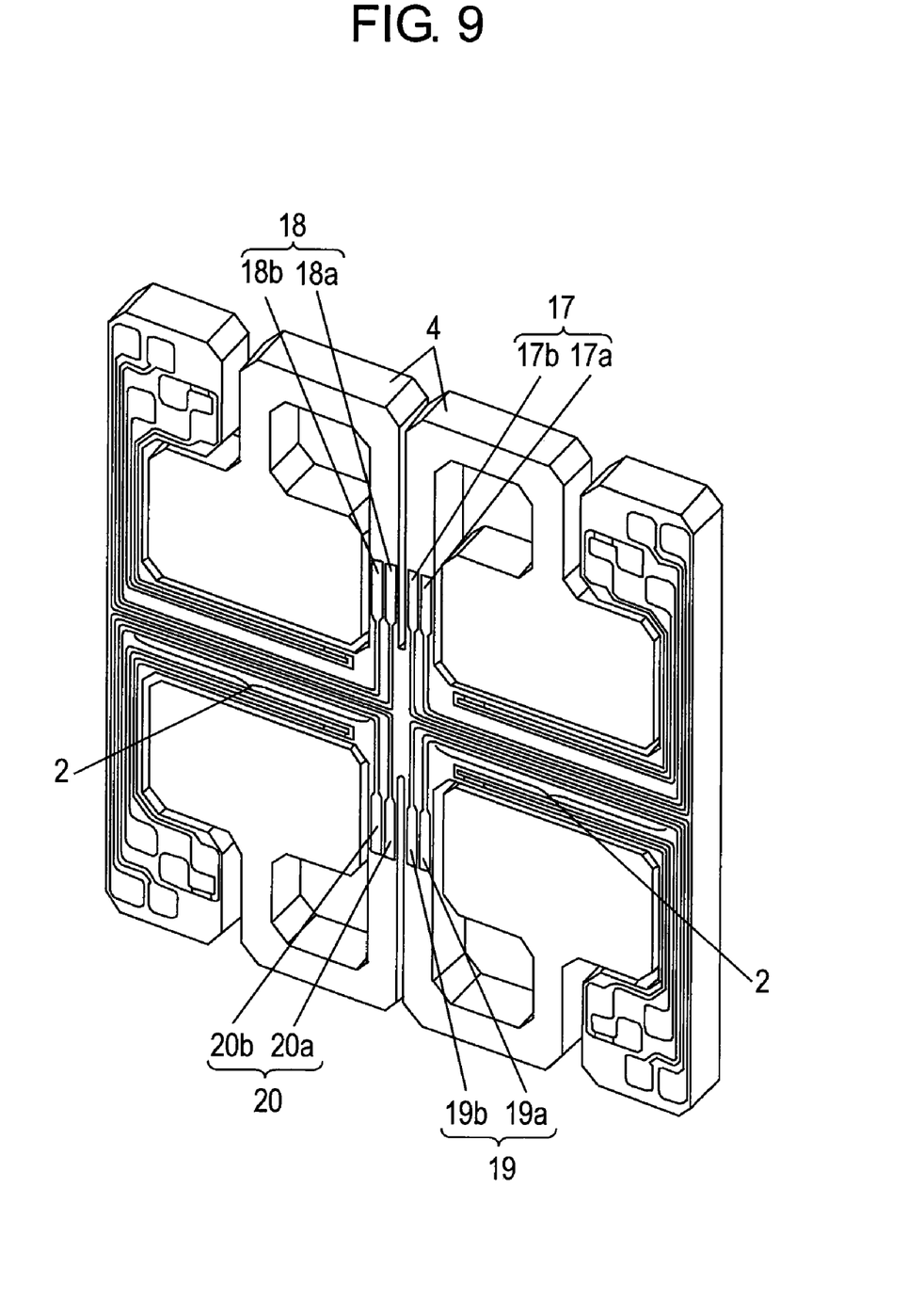
FIG. 9 is a perspective view illustrating a sensing element of an angular velocity sensor according to another exemplary embodiment of the present invention.
Figure 10:
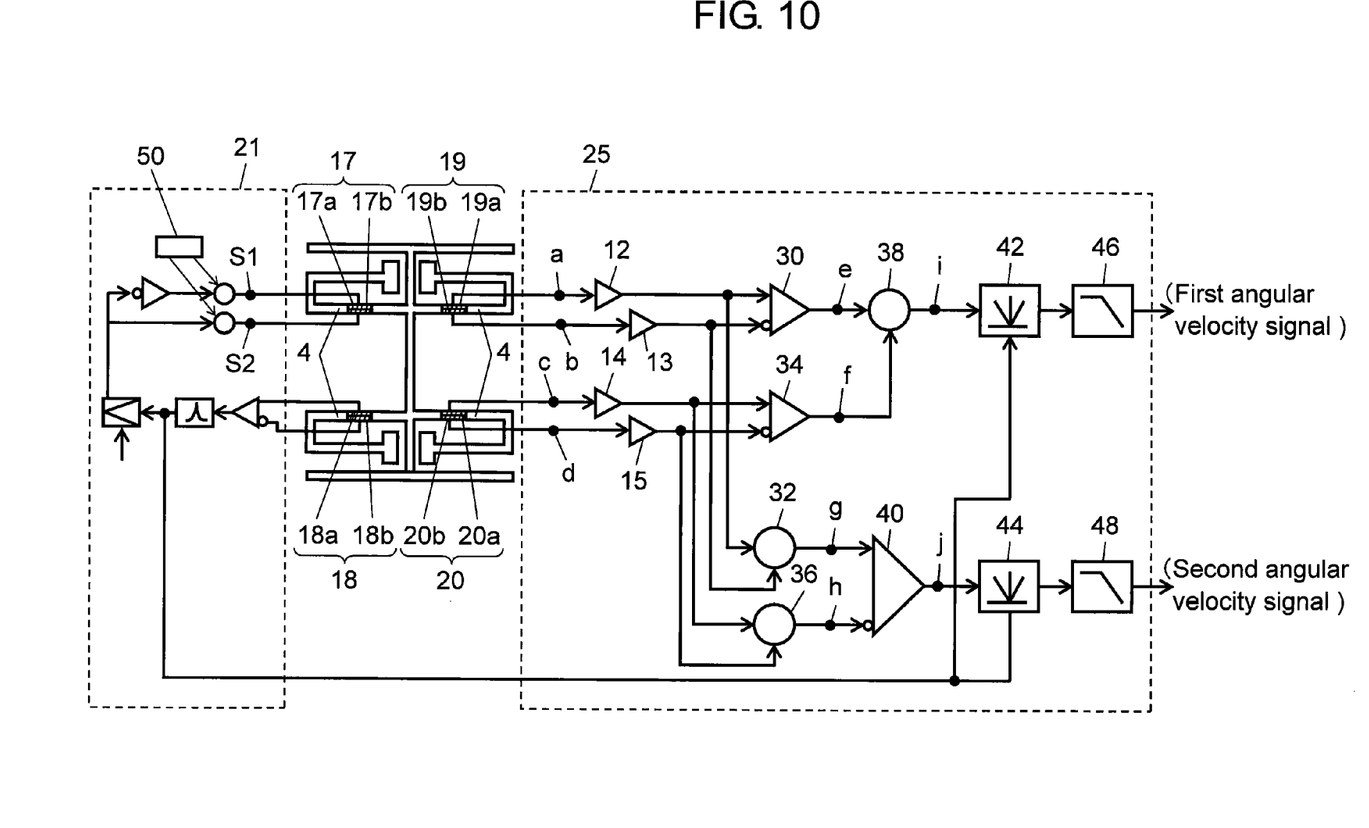
FIG. 10 is a circuit block diagram of the above angular velocity sensor.

FIG. 9 is a perspective view showing a sensing element of an angular velocity sensor according to another exemplary embodiment of the present invention, and FIG. 10 is a circuit block diagram of this angular velocity sensor.

The sensing element can be configured as shown in FIG. 9 when first and second driving electrode units 17a, 17b, first and second detecting electrode units 18a, 18b, first through fourth sensing electrode units 19a, 19b, 20a and 20b are formed on the positions of four second arms 4 in the vicinity of supporting portion 6. Connections of the sensing element to driver circuit unit 21 and detector circuit unit 25 are as shown in FIG. 10. Since these components operate in the similar manner as discussed above, their details will be skipped.

In this instance, one of second arms 4 is driven and vibrated with the origin located at the position near supporting portion 6, and it causes all of four second arms 4 and four weights 11 to vibrate in harmony with one another.

Industrial Applicability

The angular velocity sensor according to the present invention helps achieve downsizing of a variety of electronic devices, and it is therefore suitable for application to the variety of electronic devices since it does not require a large mounting area otherwise necessary for installation of a plurality of sensing elements or a plurality of angular velocity sensors.

The invention claimed is:

1. An angular velocity sensor comprising:
   a sensing element including:
      a plurality of arms;
      a driver unit formed on one of the arms for driving the arm to vibrate; and
      a first sensor unit and a second sensor unit formed on the arms for sensing distortion of the arms;
   a driver circuit unit connected to the driver unit for driving the driver unit; and
   a detector circuit unit connected to the first sensor unit and the second sensor unit for detecting an angular velocity,
   wherein the driver circuit unit supplies two driving signals to the driver unit, and
   wherein the detector circuit unit has functions of:
      outputting a first differential signal according to two sensor signals output from the first sensor unit;
      outputting a second differential signal according to two sensor signals output from the second sensor unit;
      outputting a first additional signal according to the two sensor signals output from the first sensor unit;
      outputting a second additional signal according to the two sensor signals output from the second sensor unit; and
      detecting the angular velocity from an additional signal obtained based on the first differential signal and the second differential signal, and a differential signal obtained based on the first additional signal and the second additional signal.

2. The angular velocity sensor of claim 1 further comprising:
   a failure diagnosis unit for supplying two failure diagnosis signals of same phase or opposite phase to the driver unit, and detecting a pseudo angular velocity from the additional signal and the differential signal.

3. The angular velocity sensor of claim 2, wherein the driving signals and the failure diagnosis signals have waveforms different in phase by 90 degrees with respect to each other.

4. An angular velocity sensor comprising:
   a sensing element including:
      a plurality of arms;
      a driver unit formed on one of the arms for driving the arm to vibrate; and
      a first sensor unit and a second sensor unit formed on the arms for sensing distortion of the arms;
   a driver circuit unit connected to the driver unit for driving the driver unit; and
   a detector circuit unit connected to the first sensor unit and the second sensor unit for detecting an angular velocity,
   wherein the driver circuit unit supplies two driving signals to the driver unit,
   wherein the detector circuit unit has functions of:
      outputting a first differential signal according to two sensor signals output from the first sensor unit;
      outputting a second differential signal according to two sensor signals output from the second sensor unit;
      outputting a first additional signal according to the two sensor signals output from the first sensor unit;
      outputting a second additional signal according to the two sensor signals output from the second sensor unit; and
      detecting the angular velocity from an additional signal obtained based on the first differential signal and the second differential signal, and a differential signal obtained based on the first additional signal and the second additional signal,
   wherein the plurality of arms includes:
      two orthogonally-configured arms, each consisting of a first arm coupled to a second arm in a direction generally orthogonal to each other,
      a supporting portion supporting the two first arms,
      a fixing arm connected to the supporting portion and fixed to a mount board, and
      weights provided at respective ends of the second arms;
   wherein the two second arms are configured to confront each other, and
   the first sensor unit is formed on one of the second arms and the second sensor unit is formed on the other of the second arms.

5. The angular velocity sensor of claim 4,
   wherein the first sensor unit includes a first sensing electrode unit and a second sensing electrode unit, each having a top electrode and a bottom electrode with a piezoelectric element interposed therebetween;
   the second sensor unit includes a third sensing electrode unit and a fourth sensing electrode unit, each having a top electrode and a bottom electrode with a piezoelectric element interposed therebetween;
   the first sensing electrode unit and the second sensing electrode unit are formed on one of the second arms in a confronting manner, and output two sensor signals; and
   the third sensing electrode unit and the fourth sensing electrode unit are formed on the other of the second arms in a confronting manner, and output two sensor signals.

* * * * *